(12) United States Patent
Liberti, Jr. et al.

(10) Patent No.: US 6,768,963 B2
(45) Date of Patent: Jul. 27, 2004

(54) GEO-LOCATION SYSTEMS

(75) Inventors: Joseph C. Liberti, Jr., Howell, NJ (US); Anthony A. Triolo, Manalapan, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 69 days.

(21) Appl. No.: 10/170,049

(22) Filed: Jun. 12, 2002

(65) Prior Publication Data

US 2003/0233210 A1 Dec. 18, 2003

(51) Int. Cl.[7] .............................................. G06F 15/00
(52) U.S. Cl. ....................................................... 702/150
(58) Field of Search ................................ 702/150, 152, 702/153, 190, 191; 342/450, 453, 463; 375/295, 316

(56) References Cited

U.S. PATENT DOCUMENTS 4,701,935 A * 10/1987 Namiki ........................ 375/214
6,608,593 B2 * 8/2003 Holt ............................ 342/453

* cited by examiner

*Primary Examiner*—Michael Nghiem
(74) *Attorney, Agent, or Firm*—Joseph Giordano; James W. Falk

(57) ABSTRACT

In a geo-location system, the location of an object in space is determined by transmitting polarized signals towards the object. To prevent erroneous determinations due to signals which reach the object after reflection the transmitted signals are polarized. The receiver at the object includes a cross-polarization discriminator and accepts only directly transmitted signals and not reflected signals which have been cross-polarized by the reflection. The transmitted signals may be ultra-wide band signals which can penetrate into buildings. An object whose location can thus be determined can also transmit polarized signals to another object which can not be reached by signals from the original transmitter. Further the ultra-wide band signals may utilize transmission in discontinuous frequency bands to avoid interference with existing systems.

11 Claims, 3 Drawing Sheets

GEO-LOCATION SYSTEMS

FIELD OF THE INVENTION

This invention relates to geo-location systems, which determine the unknown location of an object or node by employing signal time-of-flight information from known transmitting locations to determine the distance between the known locations and the unknown location of the receiving node or object.

BACKGROUND OF THE INVENTION

There are two general types of geo-location systems, one type employing narrow band electromagnetic waves and the other ultra-wide band waves. An example of a narrow band geo-location system is the Global Positioning System (GPS), which has a carrier frequency of 1575.42 and a chip rate of 1.023 MHz (0.06% fractional bandwidth). An example, of an ultra wide-band system is the precision locations system made by MultiSpectral, Inc., that uses a 400 MHz wide signal at 1400 MHz carrier frequency (27% fractional bandwidth).

Geo-location systems rely on the time of flight from known fixed location beacons. The receiving node or object whose location is to be determined needs to receive at least three beacons from known location transmitters in order to fix its location in space. However, these systems rely on the positioning being transmitted directly from the transmitting beacons, whereas in fact a signal from a transmitting location may be both received directly but also received via reflection from an interposed object.

This problem can be seen in FIG. 1 which is a generic depiction of a geo-location system including three transmitters 10, 11, and 12 which transmit beams 15, 16, and 17 towards the node 20 whose location is to be determined. Beams 16 and 17 go directly to receiver 20 but beam 15 is split with beam 15a being reflected off a reflecting object 22, such as a metallic object, so that its time of flight is not a true indication of the distance between transmitter 10 and receiver 20. Further, beam 15b may have to pass through an absorbing obstruction 23, such as foliage, which does not cause the beam to be reflected but considerably reduces its power. Thus if the receiver 20 is to distinguish between the two beams 15a and 15b on the basis of which is the stronger of the two, it would select beam 15a, thereby providing erroneous information to the determination of the location of the receiver based on the three received beams.

Another problem with present geo-location systems is that GPS systems cannot be used to determine the location of nodes or objects within buildings or behind walls, as the short wavelength signal of such systems does not penetrate through walls. Ultra-wide band geo-location systems have the ability to penetrate walls and other non-reflecting objects due to the low frequency content of their signal. However, ultra-wide band systems occupy such large bandwidths that, even through there power is low, they can interfere with other currently operating systems. Ultra-wide band time-of-flight systems will also suffer the same ambiguity problem arising for reflections and absorbing obstructions, as discussed above.

It is therefore an object of our invention to provide geo-location systems, which are not subject to the problems and defects of these known systems, as discussed above.

SUMMARY OF THE INVENTION

In accordance with one aspect of our invention the receiving node discriminates between directly received signals and those whose path included a reflection on the basis of the polarization of the received signal. When an electromagnetic wave is reflected from a surface, its polarization is generally shifted, such as from right hand circular to left hand-circular, which is referred to as depolarization. The received de-polarized signal is considered cross polarized to the original signal. Since the transmitter is always transmitting the same polarization, which is known to the receiver, any received signals having a polarization different from the polarization as transmitted, is a cross polarized signal which indicates a reflection having occurred in the path. While a path, which includes multiple reflections, could cause the receiver to receive a signal with the same polarization as the original signal, such a received signal would be at a much lower power level and would not significantly interfere with the determination of the receiver's location.

In accordance with another aspect of our invention wherein the transmitted signals are ultra-wide band signals, in addition to distinguishing between multi-path signals and direct signals based on signal polarization, transmission occurs in discontinuous frequency bands to provide the benefit of low frequency penetration and high frequency resolution without creating interference over a large frequency range with existing systems.

DESCRIPTION OF THE DRAWINGS

These and other aspects of my invention can be understood from the following description together with the drawings in which.

DETAILED DESCRIPTION

Figure 1:
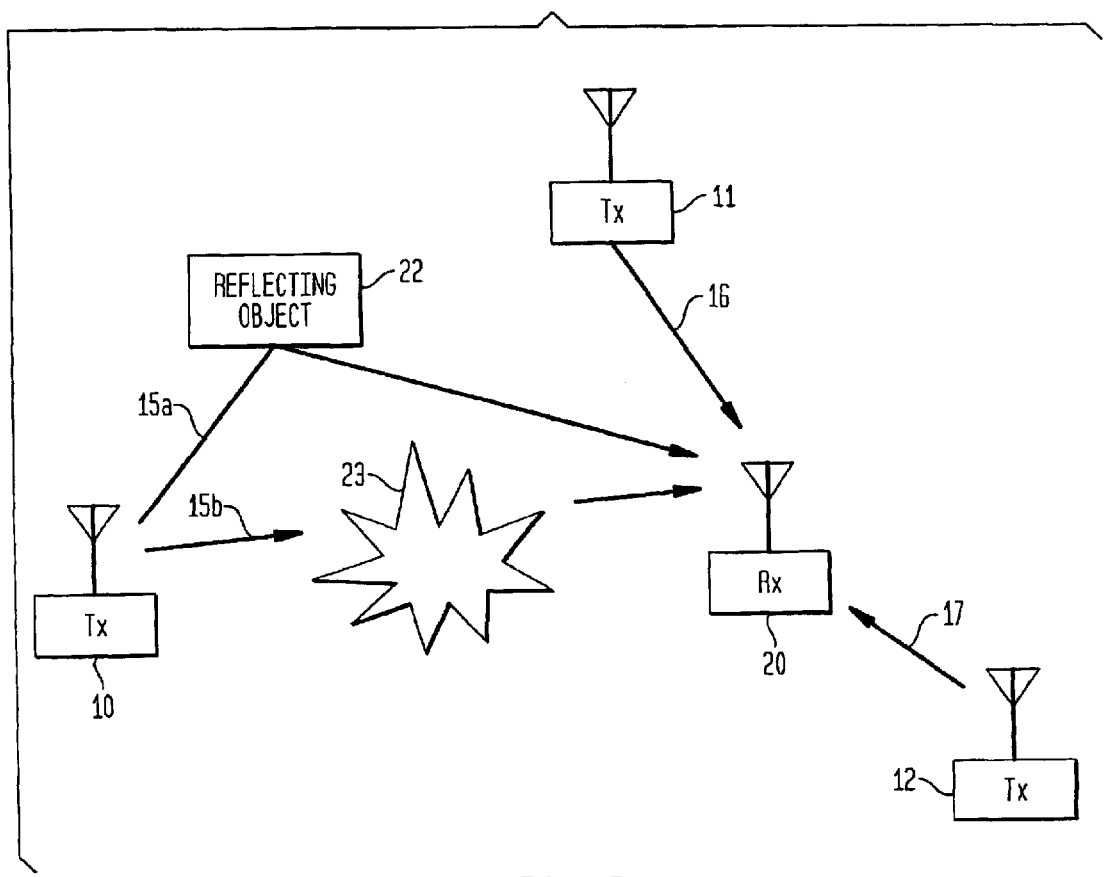
FIG. 1 depicts generically a geo-location system in which our invention may be employed.

As discussed above with reference to FIG. 1, transmitters 10, 11, and 12 are transmitting electromagnetic wave signals to the receiving node 20. Since electromagnetic waves travel at the speed of light, knowing how long it took for a wave to travel from its transmitter to the receiver 20 enables the receiver to determine the distance the receiver is from the transmitter. The receiver therefore needs to know when the transmission took place; to accomplish this, the transmitters and receivers in a system are time synchronized. Since the transmitting nodes 10, 11, and 12 are at known locations, the receiving node, which is presumably mobile, can determine its exact location from the time delay of the transmitted signals from the three transmitting nodes.

Figure 2:
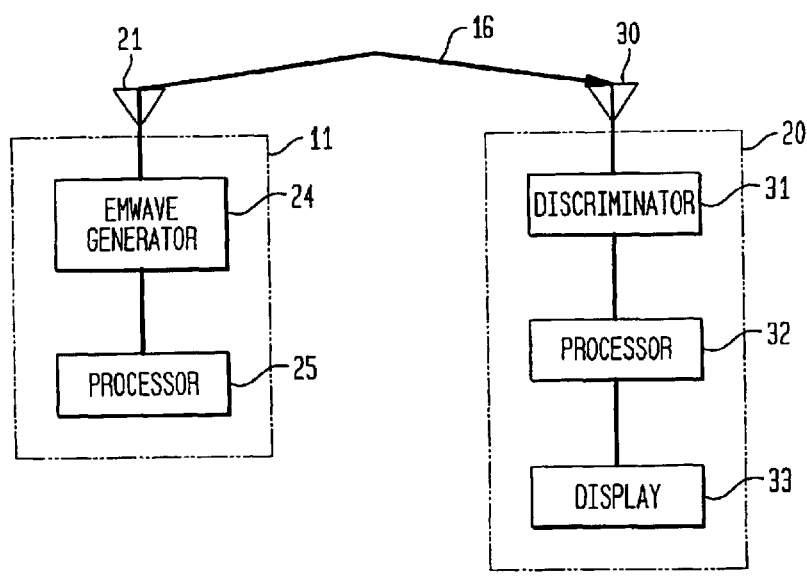
FIG. 2 is a block diagram schematic of a transmitting node and a receiving node in accordance with an embodiment of our invention.

As depicted in FIG. 2, the transmitting nodes, or which transmitting node 11 is depicted, each include an electromagnetic wave generator 24, a processor 25, which includes time synchronization circuitry, and an antenna 21 which radiates the wave 16 to the receiver 20. The receiving node 20 includes an antenna 30, a discriminator circuit 31 which filters out any cross polarization signals, a processor 32 which provides the time synchronization and performs the three signal time of flight calculation to determine the location of the receiving node 20, and a display device of some kind for indicating the result of that calculation. Such time synchronization circuitry is well known in the art, and there are many ways for implementing such-circuitry.

Figure 3:
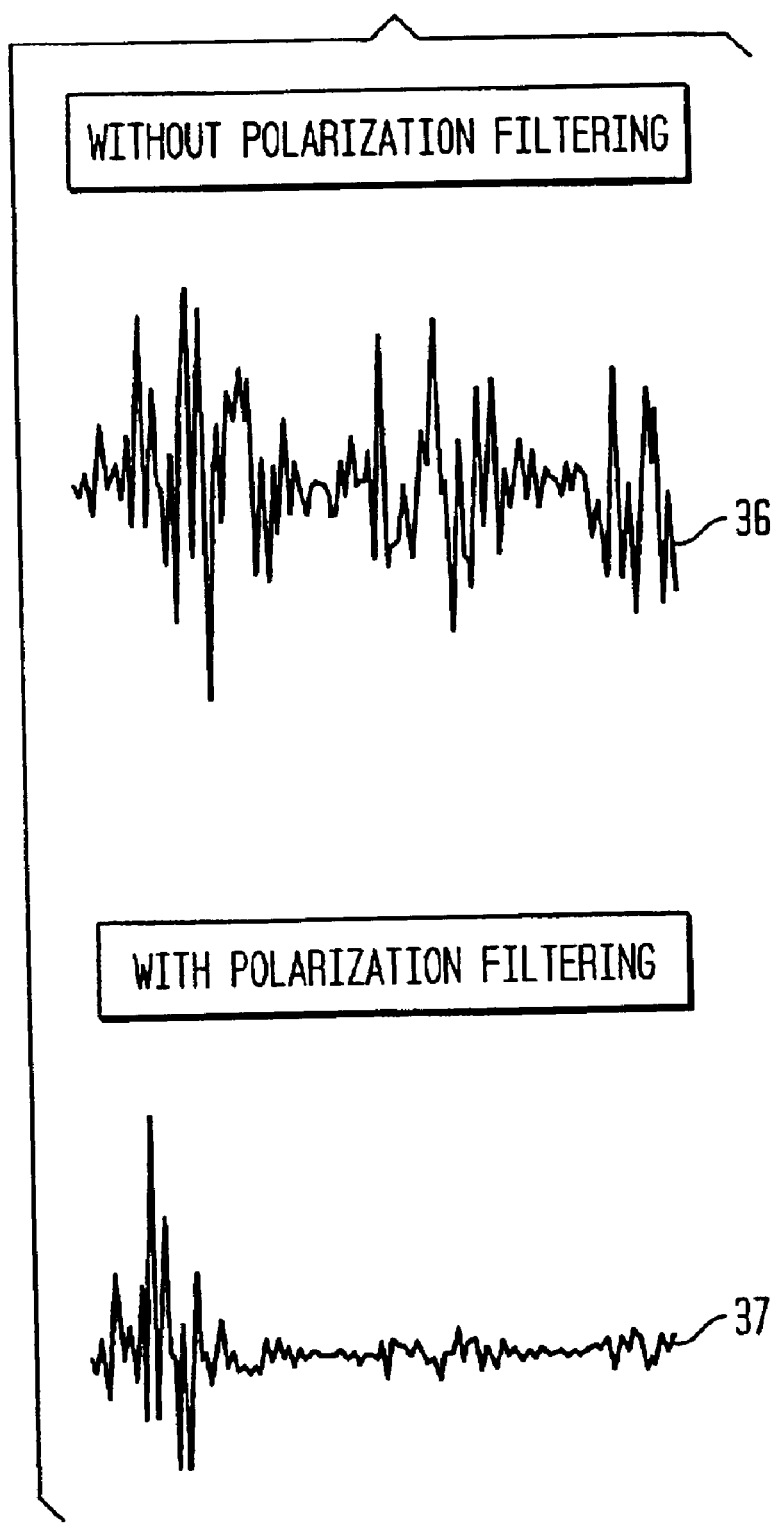
FIG. 3 is a plot of the received signals at a receiving node with and without the polarization filtering in accordance with our invention.

The effect of the presence of the discriminator circuit 31 which filters out any cross polarization signals and its importance can be seen from FIG. 3 which depicts the wave form 36 of a signal, such as signal 15, when it includes the cross polarized signal 15a from the reflecting object 22, and the wave form 37 after the cross polarization components from transmitter 10 have been filtered out.

Figure 4:
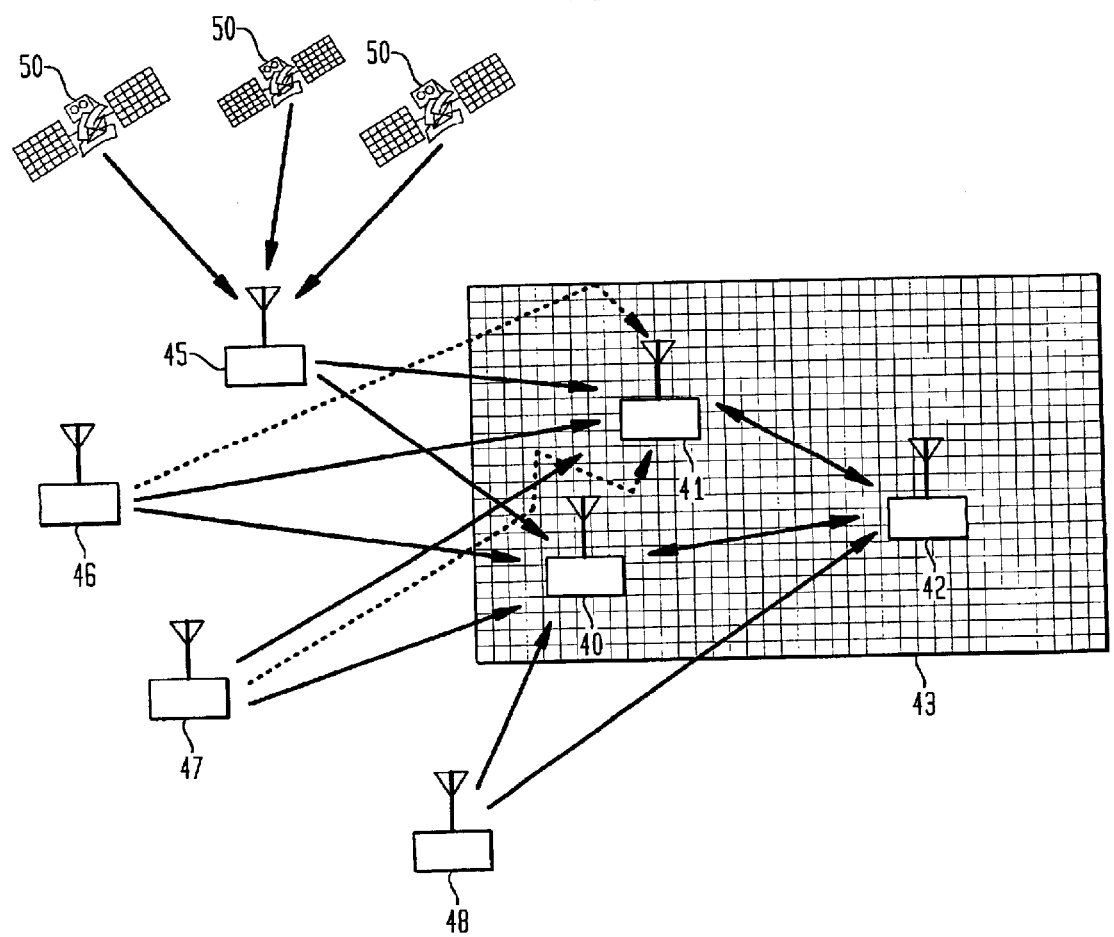
FIG. 4 is a schematic representation of a specific illustrative embodiment of your invention wherein the location of nodes within a building can be determined in accordance with aspects of our invention.

Turning now to FIG. 4, there is shown a specific illustrative embodiment of our invention wherein ultra-wide band signals are employed to determine the location of nodes 40, 41, and 42 within a building 43 based on signals transmitted from transmitters 45, 46, 47, and 48. As depicted transmitters 46, 47, and 48 may be at fixed known locations while transmitter 45 may itself be mobile, but its location is determinable from global positioning satellites 50, as is known in the art; alternatively all of the transmitting nodes may be mobile but locatable by the global positioning satellites.

As shown in FIG. 4 receiving nodes 40 and 41 are directly impinged by the ultra-wide band signals from the transmitting nodes 45, 46, 47, and 48, while receiving node 42 is impinged directly only by the signals from transmitting node 48. However, in accordance with another aspect of our invention, receiving nodes 40 and 41 are actually transceivers and include both the receiving circuitry, as depicted in FIG. 2, and also a transmitting signal generator, so that once the locations of nodes 40 and 41 are determined, they can serve as the transmitting nodes together with transmitter 48 to determine the location of the receiving node 42 which may be located further within the building 43 and thus is not directly impinged by the other transmitting nodes.

In this embodiment both the polarization of the transmitted signals is utilized to reject, or identify, multipath or reflected signals and ultra-wide band signals are employed to enable through wall penetration, with at least one of the receivers being a transceiver and serving both as a receiving node and the transmitting node for a subsequent receiving node.

To prevent interference with other radio systems, such as commercial cellular bands or geophysical positioning systems, the ultra-wide band signals are transmitted with a discontinuous frequency spectrum containing both high and low frequency components. Further in accordance with our invention the ultra-wide band signal can occupy a very large band, but with notches placed at the location of licensed frequency bands to prevent interference with such licensed frequency bands.

While specific embodiments of our invention have been described, it is to be understood that other embodiments may be used without departing from the spirit and scope of our invention.

What is claimed is:

1. A geo-location system for determining the location of an object, said system comprising:

a plurality of transmitters each transmitting polarized signals towards the object; and a receiver at the object for receiving said polarized signals from each of said transmitters, said receiver including a cross polarization discriminator for accepting signals having the same polarization as the transmitted signals and rejecting cross-polarization signals and a processor connected to said discriminator for performing signal time of flight calculations to determine the location of the object.

2. The system of claim 1 wherein said signals are ultra-wide band propagation signals.

3. The system of claim 2 wherein said transmitted signals are in discontinuous frequency bands.

4. The system of claim 1 wherein said transmitters and said receiver are time synchronized.

5. A system for determining the location of an object, said system comprising:

a plurality of transmitters for transmitting polarized signals towards the object; and a receiver at the object for receiving said polarized signals, said receiver including a cross polarization discriminator for accepting signals having the same polarization as the transmitted signals and rejecting cross-polarization signals and wherein said receiver is a transceiver and which, upon determination of its location, transmits a polarized signal to another receiver to assist in determining the location of an object associated with said another receiver.

6. A method for determining the location of an object by the time flight of transmitted electromagnetic beam signals comprising the steps of:

transmitting polarized electromagnetic beam signals from transmitters at known locations towards the object;

receiving at the object said transmitted electromagnetic beam signals;

pre-processing the received electromagnetic beam signals to remove therefrom any cross-polarization signals; and determining the location of the object from the transmitted beam signals after said pre-processing.

7. The method of claim 6 wherein said transmitters and said receiver are time synchronized.

8. The method of claim 6 wherein said transmitted signal are ultra-wide band propagation signals.

9. The method of claim 8 wherein said ultra-wide band propagation signals are transmitted in discontinuous frequency bands.

10. The method for determining the location of an object by time of flight of transmitted electromagnetic beam signals from transmitters at known locations when at least one of said transmitted signals can not reach a receiver associated with the object, the method comprising the steps of:

transmitting polarized electromagnetic beam signals to a receiver associated with another object whose location is not known;

receiving the polarized electromagnetic beams signals at said another object;

pre-processing the received electromagnetic beam signals from the transmitters to remove therefrom cross polarization propagation signals;

determining the location of said another object after said pre-processing step; and transmitting from said another object a polarized electromagnetic beam signal to said object to assist in the determination of the location of said object.

11. The method of claim 10 wherein said transmitters and said receivers are time synchronized.

* * * * *